United States Patent
Fujimori

(10) Patent No.: US 7,672,034 B2
(45) Date of Patent: Mar. 2, 2010

(54) METHOD FOR MANUFACTURING OPTICAL MODULATOR, OPTICAL MODULATOR, AND OPTICAL MODULATION SYSTEM

(75) Inventor: Yoshikazu Fujimori, Kyoto (JP)

(73) Assignee: Rohm Co., Ltd. (JP)

( * ) Notice: Subject to any disclaimer, the term of this patent is extended or adjusted under 35 U.S.C. 154(b) by 126 days.

(21) Appl. No.: 11/911,314

(22) PCT Filed: Apr. 7, 2006

(86) PCT No.: PCT/JP2006/307453

§ 371 (c)(1),
(2), (4) Date: Oct. 11, 2007

(87) PCT Pub. No.: WO2006/109725

PCT Pub. Date: Oct. 19, 2006

(65) Prior Publication Data

US 2009/0034048 A1   Feb. 5, 2009

(30) Foreign Application Priority Data

Apr. 11, 2005   (JP) .............................. 2005-113763

(51) Int. Cl.
*G02F 1/03* (2006.01)
(52) U.S. Cl. .................... 359/247; 359/322; 359/248; 359/252; 359/254
(58) Field of Classification Search .................. 359/247
See application file for complete search history.

(56) References Cited

U.S. PATENT DOCUMENTS

| 5,061,404 | A | * | 10/1991 | Wu et al. ..................... 252/582 |
| 5,777,792 | A | * | 7/1998 | Okada et al. ................. 359/584 |
| 6,456,419 | B1 | * | 9/2002 | Winker et al. ............... 359/279 |
| 7,324,260 | B2 | * | 1/2008 | Nakaho ....................... 359/265 |
| 7,411,724 | B2 | * | 8/2008 | Cicchiello et al. ........... 359/322 |
| 2004/0129949 | A1 | * | 7/2004 | Deliwala et al. ............ 257/194 |

FOREIGN PATENT DOCUMENTS

| JP | 5-257103 A | 10/1993 |
| JP | 7-146657 A | 6/1995 |

(Continued)

OTHER PUBLICATIONS

International Search Report for International Application No. PCT/JP2006/307453 mailed Jul. 18, 2006.

(Continued)

*Primary Examiner*—Jessica T Stultz
(74) *Attorney, Agent, or Firm*—Cantor Colburn LLP

(57) ABSTRACT

A manufacturing method is provided for a light modulation device that improves utilization efficiency of light. After forming a first reflective layer using a metallic material such as Pt or the like, on a substrate, a light modulating film is formed using an electro-optic material in which refractive index changes in accordance with an applied electrical field. After that, planarization is carried out so that irregularities on an upper surface of the light modulating film are less than or equal to $1/100$ of the wavelength of light incident on the light modulation device. A transparent electrode is then formed using ITO, ZnO, or the like, on the light modulating film, and a second reflective layer including a dielectric multilayer is formed.

8 Claims, 9 Drawing Sheets

FOREIGN PATENT DOCUMENTS

JP          2002-297008 A      10/2002

OTHER PUBLICATIONS

Written Opinion of the International Searching Authority; PCT/JP2006/307453; Date of Issuance: Oct. 16, 2007.

R. J. Simes, et al.; "Electrically tunable Fabry-Perot mirror using multiple quantum well index modulation"; 1988 American Institute of Physics; Appl. Phys. Lett. 53 (8), Aug. 22, 1988; pp. 637-639.

H.C. Chao, et al., "Polysilicon Fabry-Perot cavities deposited with dichlorosilane in a reduced pressure chemical vapour deposition reactor for thermal sensing"; Electronics Letters Jan. 6, 1994; vol. 30., No. 1; pp. 80-81.

* cited by examiner

METHOD FOR MANUFACTURING OPTICAL MODULATOR, OPTICAL MODULATOR, AND OPTICAL MODULATION SYSTEM

CROSS REFERENCE TO RELATED APPLICATIONS

This is a U.S. national stage of application No. PCT/JP2006/307453, filed on 7 Apr. 2006. Priority under 35 U.S.C. §119(a) and 35 U.S.C. 365(b) is claimed from Japanese Application No. 2005-113763, filed 11 Apr. 2005, the disclosure of which is also incorporated herein by reference.

BACKGROUND OF THE INVENTION

1. Field of the Invention

The present invention relates to a light modulation device that has a resonator structure.

2. Description of the Related Art

In recent years, as a recording method for large volumes, digital information recording systems that use the principle of holograms have become known (for example, Patent Document 1).

As a material for a spatial light modulator of a hologram recording device, a material having electro-optical effects such as, for example, lead lanthanum zirconate titanate (referred to below as PLZT) or the like, can be used. PLZT is a transparent ceramic having a composition of $(Pb_{1-y}La_y)(Zr_{1-x}Ti_x)O_3$. An electro-optical effect is a phenomenon in which, if an electrical field is applied to a material, polarization is produced in the material so that the refractive index changes. If an electro-optical effect is used, by switching an applied voltage on and off, it is possible to switch the phase of the light. As a result, it is possible to apply a light modulating material, which has an electro-optical effect, to an optical shutter of the spatial light modulator or the like.

Conventionally, bulk PLZT has been widely used for application to devices such as the optical shutter or the like (Patent Document 2). However, with the optical shutter using the bulk PLZT, it is difficult to respond to demand for miniaturization and integration, and to demand for reduction in operating voltage and lowering of costs. Furthermore, since the bulk method includes processing at a high temperature of 1000° C. or more, after mixing metal-oxide that is raw material, when applied to a device formation process, many constraints on selection of material, device structure, and the like, are added.

From this situation, instead of the bulk PLZT, tests are being considered in which thin film PLZT formed on a substrate is applied to an optical control element. Patent Document 3 describes a display device in which a PLZT film is formed on a transparent substrate, such as glass or the like, and a comb-shaped electrode is provided thereon. This display device has a configuration in which a polarizing plate is provided on both faces of a display board on which the PLZT film is formed. Here, by electrode terminals of each pixel being connected to an external drive circuit, a desired pixel can be driven, and a desired display can be made by transmitted light from a light source provided on one face of the display board.

Patent Document 1: Japanese Patent Application, Laid Open No. 2002-297008
Patent Document 2: Japanese Patent Application, Laid Open No. Hei5-257103
Patent Document 3: Japanese Patent Application, Laid Open No. Hei7-146657

The inventors of the present invention carried out investigation concerning a light modulation device using PLZT film as a light modulating film, as an example of applying a thin film of PLZT to an optical control device. This light modulation device is provided with a Fabry-Perot type of resonator in which the light modulating film is formed on a first reflective layer, and a second reflective layer is formed on the light modulating film. Reflected light from the resonator is controlled by applying an electrical field to the light modulating film to change its refractive index, so as to shift resonance wavelength of the resonator.

However, the inventors of the present invention found that in cases in which the formed light modulating film is used as it is, the intensity of the reflected light decreases with respect to the intensity of incident light in the light modulation device, that is, that the utilization efficiency of the light cannot easily be raised. In particular, it was found that when a light source of short-wavelength blue light (approximately 450 nm) or violet-blue (approximately 400 nm) is used, the utilization efficiency of the light deteriorates significantly.

SUMMARY OF THE INVENTION

The present invention has been made in view of these circumstances, and a general purpose thereof is to provide a manufacturing method for a light modulation device that improves light utilization efficiency.

To solve the abovementioned problems, in the manufacturing method for the light modulation device in an embodiment of the present invention, the light modulation device being provided with a Fabry-Perot type of resonator in which a light modulating film, whose refractive index changes in accordance with an applied electrical field, is arranged between two reflective layers, the method includes, after forming the light modulating film on a predetermined reflective layer, a process of planarizing an upper surface of the light modulating film.

According to this embodiment, by planarizing the upper surface of the light modulating film, it is possible to manufacture the light modulation device, in which light scattering is prevented, and light utilization efficiency is improved.

The planarization may be carried out so that irregularities on the upper surface of light modulating film are less than or equal to $1/100$ of the wavelength of light incident on the light modulation device. In these cases, it is possible to manufacture the light modulation device, in which the light scattering is preferably prevented and the light utilization efficiency is improved. For example, when a blue-violet laser with a wavelength of 400 nm is used, the irregularities are less than or equal to 4 nm.

Another embodiment of the present invention also relates to the light modulation device. The light modulation device is provided with a Fabry-Perot type of resonator, in which a light modulating film, whose refractive index changes in accordance with an applied electrical field, is arranged between two reflective layers, wherein irregularities on the upper surface of the light modulating film are less than or equal to $1/100$ of the wavelength of light incident on the light modulation device.

The light modulating film may be an electro-optic material whose refractive index changes in proportion to the applied electric field to the power of 2. The electro-optic material may be lead zirconate titanate or lead lanthanum zirconate titanate.

The resonator is provided with: a substrate, a first reflective layer arranged on the substrate, a light modulating film, arranged on the first reflective layer, and whose refractive index can be controlled by an applied electrical field, a second reflective layer arranged on the light modulating film, and an electrode pair for applying the electrical field to the light modulating film.

A controller may additionally be provided for modulating and outputting light incident on the resonator, by applying a control voltage to the resonator.

A bias unit may additionally be provided for applying, to the resonator, a bias voltage for adjusting a resonance wavelength of the resonator. In these cases, since the resonance wavelength of the resonator can be shifted, it is possible to preferably adjust the resonator wavelength.

The light modulation device may be formed on one chip, as a semiconductor integrated circuit device. In these cases, it is possible to provide a small sized light modulation device.

Another embodiment of the present invention relates to a light modulating system. This light modulating system is provided with a light modulation device, a light emitter for radiating light on the light modulation device, and a light receptor for receiving light outputted from the light modulation device. According to this embodiment, it is possible to realize, for example, a hologram recording device or a display device.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

An outline of a light modulation device related to an embodiment will be explained. The light modulation device is one in which reflectance changes in accordance with voltage application from outside. The light modulation device has a Fabry-Perot type of resonator structure, and is provided with a light modulating film whose refractive index changes in accordance with an applied electrical field, and two reflective layers formed so as to sandwich the light modulating film. In a state in which a laser is incident on the light modulation device, when a control signal is provided, it is possible to change the reflectance of the light modulation device, and it is possible to control the intensity of a reflected laser. Since the intensity of the laser reflected by the light modulation device is proportional to the reflectance, by recording or detecting the reflected light by a recording medium or a light detection device, usage is possible in various applications.

Figure 1:
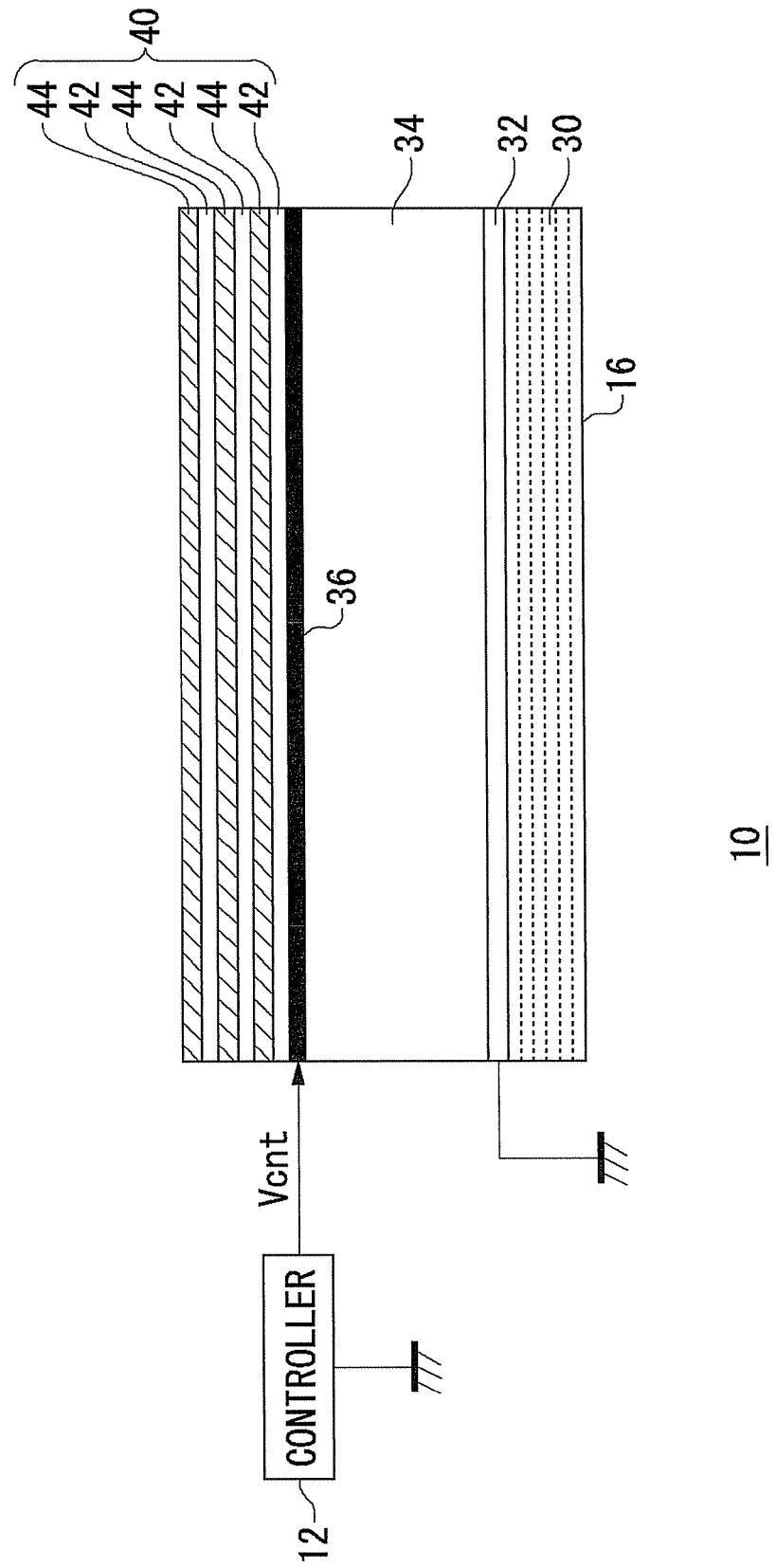
FIG. 1 is a view showing a configuration of a light modulation device related to an embodiment.

FIG. 1 is a view showing a configuration of the light modulation device related to the embodiment. The light modulation device 10 is provided with a controller 12, and a resonator 16. The resonator 16 shown in FIG. 1 is a sectional view of the resonator 16. The resonator 16 includes a substrate 30, a first reflective layer 32, the light modulating film 34, a transparent electrode 36, and the second reflective layer 40.

The resonator 16 is formed on the substrate 30. As material of the substrate 30, glass having a flat surface, silicon, or the like, may preferably be used. For example, if the substrate 30 is formed of silicon, a switching element may be arranged on the substrate and the resonator 16 may be formed thereon.

The first reflective layer 32 is formed on the substrate 30. Metallic material such as, for example, Pt or the like, can preferably be used as a material for the first reflective layer 32. The thickness of the first reflective layer 32 is approximately 200 nm. In the present embodiment, the first reflective layer 32 is formed of Pt, and this first reflective layer 32 functions also as an electrode that applies an electrical field to the light modulating film 34 as described below. When the first reflective layer 32 is formed of Pt, the reflectance of the first reflective layer 32 is approximately 50% to 80%.

The light modulating film 34 is arranged on an upper face of the first reflective layer 32. As a material of this light modulating film 34, solid electro-optic material is selected, in which refractive index changes in accordance with the applied electrical field. PLZT, PZT (lead zirconate titanate), $LiNbO_3$, GaA-MQW, SBN ($(Sr, Ba)Nb_2O_6$), or the like can be used as this type of electro-optic material, and PLZT in particular is preferably used.

The film thickness t of the light modulating film 34 is decided in accordance with incident angle and wavelength of incident light, and when, for example, the incident light is red light in the neighborhood of 650 nm, it is desirable that the film thickness should be in a range of 500 nm to 1500 nm. As described below, in order to apply the electrical field, which is applied to the light modulating film 34, in the direction of thickness, with the film thickness below 1500 nm, it is easy to apply the electrical field to obtain adequate change in refractive index. Furthermore, by having the film thickness of 500 nm or greater, it is possible to obtain adequate change in optical film thickness.

With regard to the light modulation device 10 related to the present embodiment, after forming the light modulating film 34, planarization of the upper surface of the light modulating film 34 is carried out. This planarization has an effect of improving the utilization efficiency of the light.

With regard to a polycrystalline substance, such as PLZT or the like, irregularities are present on surfaces thereof due to crystal grain boundaries. The inventors of the present invention found that when a PLZT film of 1000 nm is formed, irregularities of approximately 30 to 50 nm are present on the upper surface of the light modulating film 34. When this PLZT film is used as it is, as the light modulating film 34, incident light and reflected light are scattered due to the irregularities, and the utilization efficiency of the light deteriorates. By making these irregularities small, to an extent that effects of scattering disappear, it is possible to prevent the scattering of the light, and to improve the utilization efficiency of the light.

It is desirable that the planarization be carried out so that the irregularities on the upper surface of the light modulating film 34 are less than or equal to 1/100 of the wavelength of the incident light. In this way, the effect of the scattering can be preferably removed. Here, the irregularities are expressed as center line average surface roughness (Ra). In addition, the irregularities can be measured by an atomic force microscope (AFM).

The planarization can be carried out by CMP (Chemical Mechanical Polishing). Furthermore, the planarization can also be carried out by chemical etching or mechanical grinding.

The transparent electrode 36 is arranged on the upper surface of the light modulating film 34. The transparent electrode 36 may be formed, for example, from ITO (Indium Tin Oxide), ZnO, $IrO_2$, or the like. When the transparent electrode 36 is formed of ITO or ZnO, the thickness thereof is approximately 100 nm to 150 nm. When formed of $IrO_2$, it is desirable that the film be thin, for example, approximately 50 nm. Since there is a tradeoff relationship between resistance value and transmittance, the thickness of the transparent electrode 36 may be decided experimentally.

The second reflective layer 40 is formed on the upper surface of the transparent electrode 36. The second reflective layer 40 is formed by a dielectric multilayer film, and a first dielectric film 42 and a second dielectric film 44 that have different refractive indices n are layered alternately. As a combination of materials of the first dielectric film 42 and a second dielectric film 44, $SiO_2$ (n=1.48) $Si_3N_4$ (n=2.0) can be used.

In cases in which the dielectric multilayer film is formed of a silicon dioxide film and a silicon nitride film, a manufacturing process and a manufacturing apparatus for a silicon semiconductor integrated circuit can be used.

The dielectric multilayer film can be formed by a plasma CVD (Chemical Vapor Deposition) method. The $SiO_2$ film can be grown in conditions of a temperature of 200° C. in an atmosphere of TEOS and $O_2$, and the $Si_3N_4$ film can be preferably grown in conditions of a temperature of 200° C. in an atmosphere of $SiH_4$ and $NH_3$. Furthermore, the dielectric multilayer film may be formed by an ion-beam sputtering technique.

Respective thicknesses t1 and t2 of the first dielectric film 42 and the second dielectric film 44 may be designed to be ¼ of the wavelength of light incident on the resonator 16. That is, if the wavelength of the light incident on the resonator 16 is λ and the refractive index of the dielectric film is n, the film thickness t of one layer of each dielectric film is adjusted so that t=λ/(n×4).

For example, in cases where a red color laser of wavelength λ=633 nm is used in the light modulation device 10, when the first dielectric film 42 has $SiO_2$ (N=1.48) as a material, the film thickness t1 of the first dielectric film 42 is approximately t1=633/(4×1.48)=106 nm. Furthermore, when $Si_3N_4$ (n=2.0) is used as a material, the film thickness t2 of the second dielectric film 44 is approximately t2=633/(4×2)=79 nm. The film thicknesses t1 and t2 of the dielectric films that make up the second reflective layer 40 need not necessarily be designed to be strictly λ/(n×4).

As a material for the dielectric films, $TiO_3$ (n=2.2) may be used instead of the silicon nitride film. In such cases, the film thickness t2 of the second dielectric film 44 is approximately t2=633/(4×2.2)=72 nm.

In FIG. 1, the reflectance R2 of the light from the light modulating film 34 incident on the second reflective layer 40 is designed to be equal to the reflectance R1 of the light from the light modulating film 34 incident on the first reflective layer 32. The reflectance R1 is determined in accordance with metallic material used in the first reflective layer 32, and when Pt is selected, is 50% to 80%.

Accordingly, at this time, the reflectance R2 is designed to be 50% to 80%. The reflectance R2 of the second reflective layer 40 can be adjusted by the material and film thickness of the first dielectric film 42 and the second dielectric film 44. In the present embodiment, as shown in FIG. 1, the second reflective layer 40 is built up of 3 layers of each of the first dielectric film 42 and the second dielectric film 44, alternately stacked. In the second reflective layer 40, the first dielectric film 42 and the second dielectric film 44 may also be stacked in a reverse order. Furthermore, in order to perform fine adjustment of the reflectance R2, a third dielectric film may additionally be stacked.

The second reflective layer 40 may also be a half-mirror formed of a metallic thin film. In such cases, the manufacturing process can be simplified in comparison to cases in which the dielectric multilayer film is formed.

In the present embodiment, the transparent electrode 36 and the first reflective layer 32 form an electrode pair. The electrical potential of the first reflective layer 32 is fixed, for example, to a ground potential, and the potential of the transparent electrode 36 is controlled by the controller 12.

The controller 12 can generate and output a control voltage Vcnt that modulates and outputs the light incident on the light modulation device 10. The control voltage Vcnt is a signal that takes two values, a high level VH or a low level VL.

Figure 2:
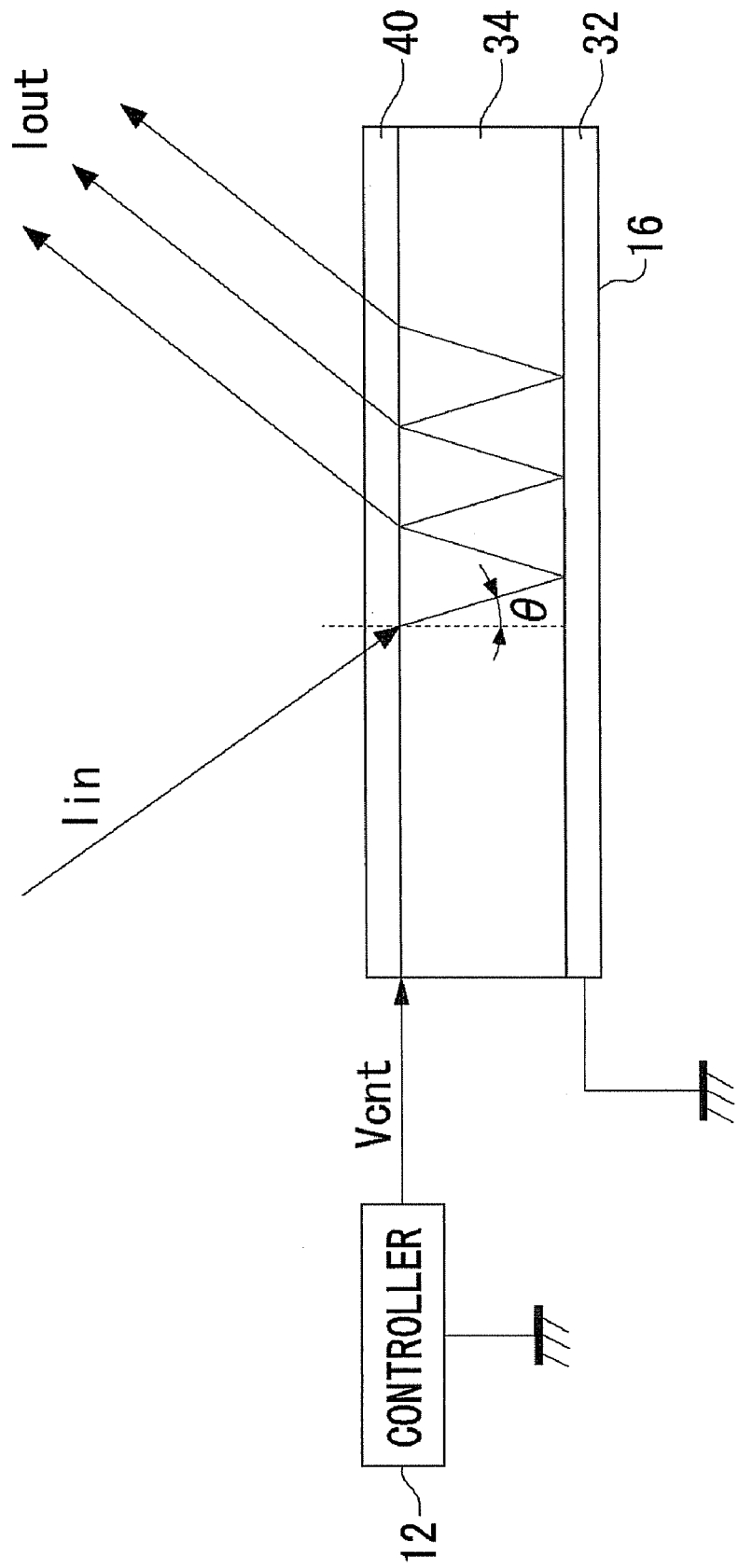
FIG. 2 is a view schematically showing an operation state of the light modulation device.

An explanation is now given concerning operation of the light modulation device 10 configured as described above. FIG. 2 schematically shows an operation state of the light modulation device 10. In this figure, component elements that are the same as in FIG. 1 are given the same reference symbols. Furthermore, for simplicity, component elements such as the transparent electrode 36, and the like, are omitted.

A laser of intensity Iin is incident from above the resonator 16. The first reflective layer 32, the light modulating film 34, and the second reflective layer 40 of the resonator 16 make up the Fabry-Perot type of resonator; a part of the incident light is confined, and that part is reflected. If the intensity of the incident laser is Iin, and the intensity of the laser that is reflected by the resonator 16 is Iout, the reflectance ratio R of the resonator 16 is defined by R=Iout/Iin.

Figure 3:
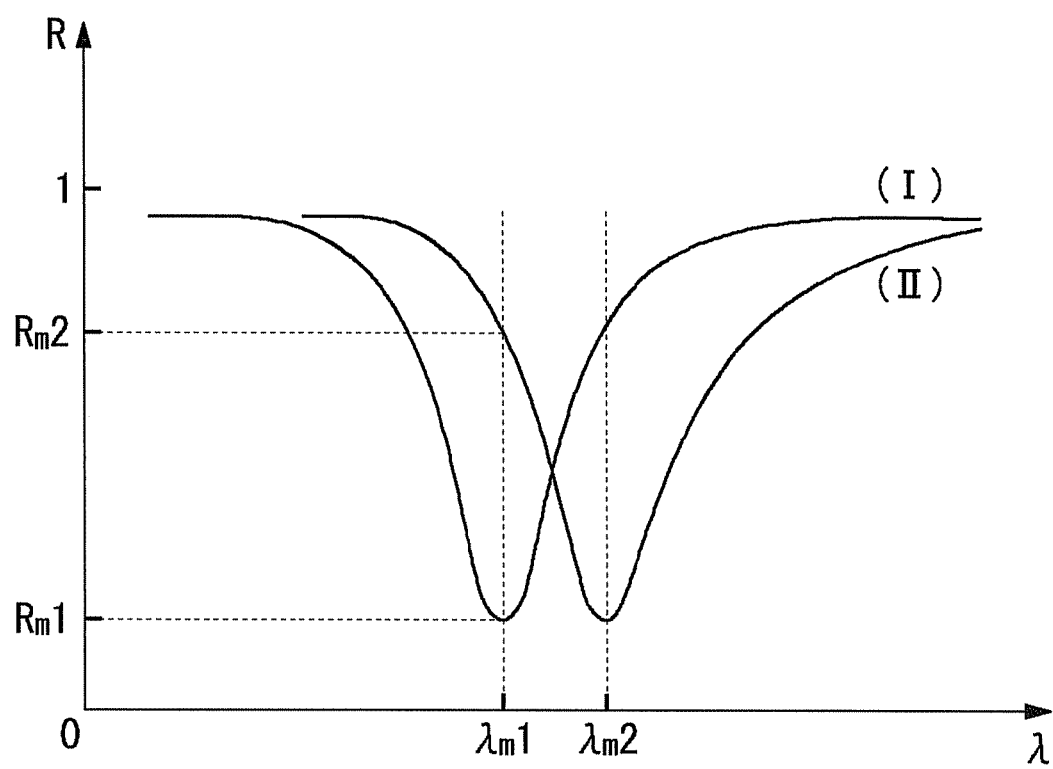
FIG. 3 is a view showing a relationship between reflectance R and wavelength λ of light incident on a resonator.

FIG. 3 is a view showing a relationship between reflectance R and wavelength λ of the light incident on the resonator 16. The resonance wavelength of the Fabry-Perot type resonator, composed of the first reflective layer 32, the light modulating film 34, and the second reflective layer 40, is given by:

$$\lambda_m = (2nt \cos \theta)/m \qquad \text{Equation 1}$$

Here, m is order, n is the refractive index of the light modulating film 34, t is the film thickness of the light modulating film 34, and θ is the angle of incidence of the laser on the light modulating film 34. As shown in FIG. 3, the reflectance R of the resonator 16 takes a minimum value at the resonance wavelength $\lambda_m$.

As described above, the refractive index n of the light modulating film 34 is dependent on the electrical field E applied to the electrode pair. Now, with the first reflective layer 32 as a ground potential, if the control voltage Vcnt is applied to the transparent electrode 36, in the light modulating film 34, the electrical field E=Vcnt/t is applied in the direction of thickness. In cases in which PLZT is used as the light modulating film 34, a relationship is established between the change amount Δn in the refractive index n of the light modulating film 34 and the applied electrical field E:

$$\Delta n = \frac{1}{2} \times (n)^3 \times R \times E^2 \qquad \text{Equation 2}$$

Here, R is an electro-optic constant (Kerr constant).

(I) shown in FIG. 3 is a reflective property when voltage is not applied to the resonator 16. At this time, the resonance wavelength of the resonator 16 is $\lambda_m 1$. When voltage is applied to the resonator 16, the refractive index of the light modulating film 34 changes, and the resonance wavelength shifts from $\lambda_m 1$ to $\lambda_m 2$. $\lambda_m 2$ has a value larger than $\lambda_m 1$. The reflective property at this time is shown by (II) in FIG. 3.

If the wavelength of the laser incident on the resonator 16 is taken as $\lambda_m 1$, and the control voltage Vcnt is changed from the ground voltage to a certain voltage value V1, by the resonance wavelength shifting, the reflectance R of the resonator 16 changes from $R_m 1$ to $R_m 2$.

Here, the ratio of the reflectance Ron when the voltage is applied, to the reflectance Roff when the voltage is not applied, Ron/Roff, is defined as an on-off ratio. When the intensity Iin of the incident light is constant, the intensity Iout of the reflected light is proportional to the reflectance. Accordingly, when the on-off ratio is large, the intensity Iout of the reflected light can be accurately controlled, meaning that the utilization efficiency of the light is also high.

The closer the reflectance R1 of the first reflective layer 32 and the reflectance R2 of the second reflective layer 40 are, the lower the reflectance R of the resonator 16 at the resonance wavelength $\lambda_m$ becomes. Accordingly, by adjusting the number of layers and the material of the dielectric multilayer film of the second reflective layer 40, as described above, and by designing the reflectance R1 of the first reflective layer 32 and the reflectance R2 at the second reflective layer 40 to be equal, the reflectance R at off time can be set low, and the on-off ratio can be high.

In this way, in the light modulation device 10 related to the present embodiment, by changing the electrical field applied to the light modulating film 34, it is possible to realize a light switch element that changes the reflectance, to control the intensity Iout of the reflected light.

Figure 4:
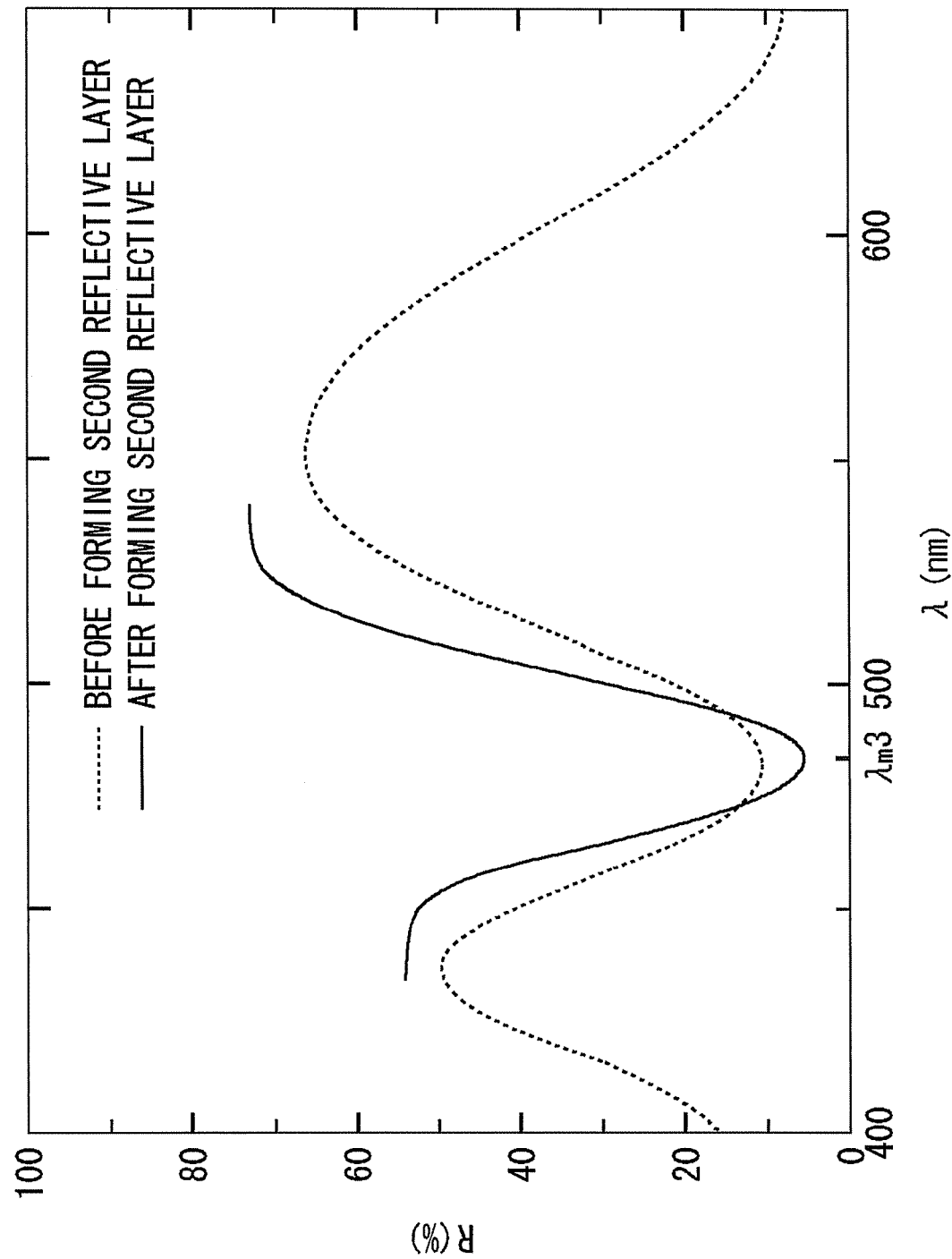
FIG. 4 is a view showing a relationship between reflectance R and wavelength λ of light incident on the light modulation device when planarization is not carried out.

Next, an explanation is given concerning effects of planarization of the upper surface of the light modulating film 34. FIG. 4 is a view showing a relationship between reflectance R and wavelength λ of light incident on the light modulation device 10 when planarization is not carried out. The dashed line of FIG. 4 shows the reflectance property before forming the second reflective layer 40, and the solid line shows the reflectance property after the second reflective layer 40 is formed. In FIG. 4, the resonance wavelength is $\lambda_m 3$.

As shown in FIG. 4, with regard to the reflectance property when planarization is not carried out, there is a difference in the reflectance at the long wavelength side and the short wavelength side at the resonance wavelength $\lambda_m 3$. With regard to the reflectance property after forming the second reflective layer 40, the reflectance is approximately 75% at most, for the long wavelength side at the resonance wavelength $\lambda_m 3$, whereas the reflectance is approximately 55% at most, for the short wavelength side from the resonance wavelength $\lambda_m 3$. In cases of this type of reflectance property, even if the control voltage is applied to the resonator 16, and the resonance wavelength $\lambda_m 3$ is shifted, there is little change in the reflectance, and the on-off ratio is small.

Figure 5:
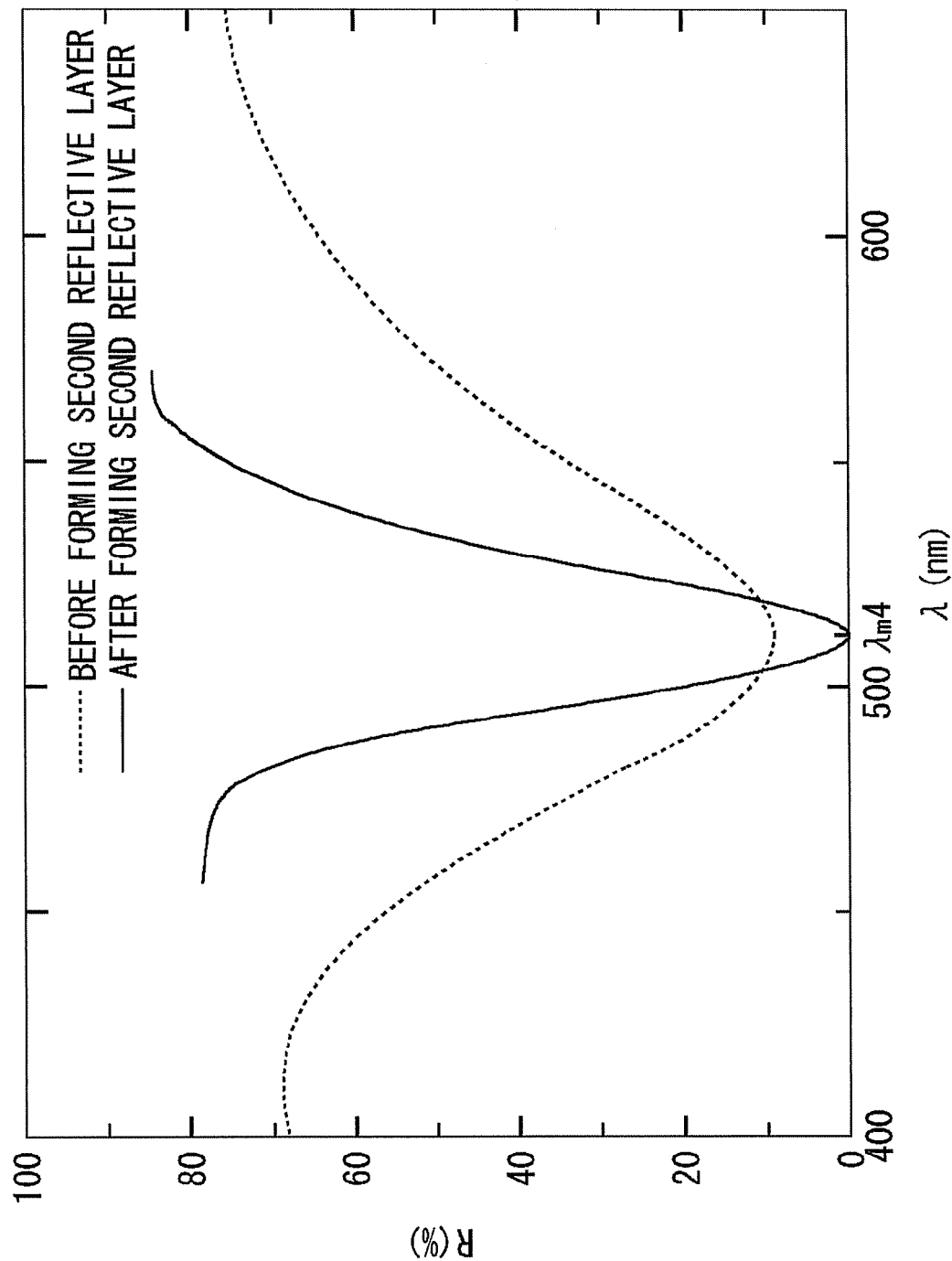
FIG. 5 is a view showing the relationship between the reflectance R and the wavelength λ of the light incident on the light modulation device when planarization is carried out.

FIG. 5 is a view showing the relationship between the reflectance R and the wavelength λ of the light incident on the light modulation device 10 when planarization is carried out. The dashed line of FIG. 5 shows the reflectance property before forming the second reflective layer 40, and the solid line shows the reflectance property after the second reflective layer 40 is formed. In FIG. 5, the resonance wavelength is $\lambda_m 4$. The resonance wavelength $\lambda_m 4$ is different from $\lambda_m 3$ shown in FIG. 4, because measurement of the film thickness of the light modulating film 34 that is the length of the resonator is carried out with a different sample.

As shown in FIG. 5, when planarization is carried out, it is understood that the reflectance property improves. In particular, the improvement in the reflectance property at the short wavelength side at the resonance wavelength is $\lambda_m 4$ is notable, and the reflectance is approximately 75% at most. In cases of this type of reflectance property, when the control voltage is applied to the resonator 16, and the resonance wavelength $\lambda_m 4$ is shifted, there is a large change in the reflectance, and the on-off ratio can be made large.

In a light modulation device in which planarization of the light modulating film 34 has not been carried out, it is considered that the decrease in the reflectance, in particular, is large at the short wavelength side from the resonance wavelength λm, on account of Rayleigh scattering. With regard to light scattering, there is Mie scattering and Rayleigh scattering, and it is known that Rayleigh scattering occurs when light collides with particles that are sufficiently small (approximately less than or equal to 1/10) in comparison to the wavelength of the light. Since scattering intensity of the Rayleigh scattering is inversely proportional to wavelength to the power of 4, scattering is larger for light of short wavelength. In a light modulation device in which planarization of the light modulating film 34 has not been carried out, since the irregularities on the upper surface of the light modulating film 34 are approximately 1/10 of the wavelength of the light, the utilization efficiency of the light decreases due to the Rayleigh scattering, but if planarization is carried out and the irregularities are very small, being less than or equal to 1/100 of the wavelength, it is possible to realize a light modulation device in which the utilization efficiency of the light is improved.

The present invention has been explained above, based on the embodiment. This embodiment is an example, and a person skilled in the art will understand that various modified examples of combinations of various component elements and various processes thereof are possible, and that such modified examples are within the scope of the present invention.

The embodiment has a configuration in which the control voltage Vcnt is applied from the controller 12 to the transparent electrode 36, but a bias voltage Vb may be superimposed on the control voltage Vcnt and applied.

Since the resonance wavelength $\lambda_m$ of the resonator 16 is given by Equation 1, it is proportional to the film thickness t of the light modulating film 34. Therefore, if there is variability in the film thickness t of the light modulating film 34 due to planarization of the light modulating film 34, there is a possibility of variability also in the resonance wavelength $\lambda_m$.

As described above, the resonance wavelength $\lambda_m$ can be changed by applying the voltage to the resonator 16. Therefore, by superimposing the bias voltage Vb on the control voltage Vcnt, and having the resonance wavelength $\lambda_m$ adjustable, variations in the film thickness can be corrected by the planarization.

Figure 6:
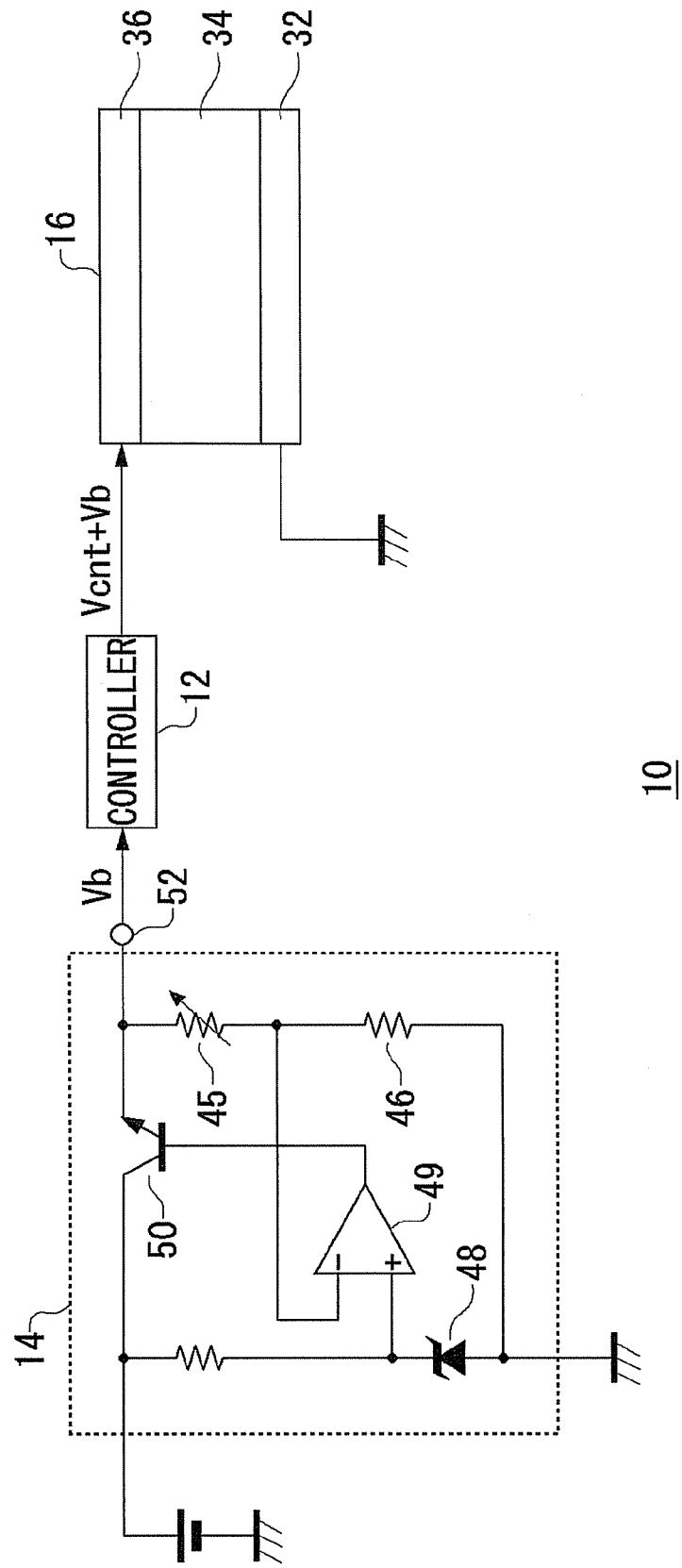
FIG. 6 is a view showing a configuration of the light modulation device in which resonance wavelength $\lambda_m$ can be adjusted.

FIG. 6 is a view showing a configuration of the light modulation device 10 in which a resonance wavelength $\lambda_m$ can be adjusted. In this figure, component elements that are the same as in FIG. 1 are given the same reference symbols. Furthermore, for simplicity, component elements, such as the second reflective layer 40, and the like, are omitted. The light modulation device 10 of FIG. 6 is provided with the resonator 16, the controller 12, and a bias unit 14 for generating the bias voltage Vb in order to adjust the resonance wavelength $\lambda_m$.

The bias unit 14 shown in FIG. 6 is a constant voltage circuit for generating the bias voltage Vb. The bias unit 14 is provided with a variable resistor 45, a resistor 46, a constant voltage diode 48, an operational amplifier 49, and a transistor 50.

When a power supply voltage is supplied to the bias unit 14, the bias voltage Vb=Vz (1+R1/R2) is outputted at an output terminal 52 of the bias unit 14. R1 is the resistance value of the variable resistor 45, R2 is the resistance value of the resistor 46, and Vz is the zener voltage of the constant voltage diode 48. The bias voltage Vb is a constant voltage that does not vary with the value of the power supply voltage, and is adjustable by changing the resistance value of the variable resistor 45.

A preferable value of the bias voltage Vb that is superimposed on the control voltage Vcnt can be obtained by measuring the film thickness t of the light modulating film 34 after planarization. The resonance wavelength $\lambda_m$ of the Fabry-Perot type resonator is given by Equation 1. Therefore, if the film thickness t of the light modulating film 34 is known, the resonance wavelength $\lambda_m$ of the resistor can be obtained. From the difference $\Delta\lambda$ between the resonance wavelength $\lambda_m$ and a target value of the resonance wavelength, a change amount $\Delta n$ of the light modulating film 34 necessary to shift the resonance wavelength $\lambda_m$ to the target value can be obtained. Since the relationship of Equation 2 is established between the change amount $\Delta n$ of the refractive index n of the light modulating film 34 and the electrical field E that is applied, is it possible to obtain the electrical field E necessary for shifting the resonance wavelength $\lambda_m$ to the target value. Since the electrical field and the voltage have a relationship E=V/t, the preferable value of the bias voltage Vb applied to the resonator 16 can be obtained.

In this way, according to the light modulation device 10 related to the present embodiment, even in cases in which there are variations in the film thickness t of the light modulating film 34 of the resonator 16 due to planarization, by adjusting the variable resistor 45 of the bias unit 14, it is possible to superimpose the preferable bias voltage Vb on the control voltage Vcnt, and to correct the resonance wavelength $\lambda_m$. In this way, since the accuracy of the planarization is relaxed, it is possible to improve the yield of the light modulation device 10.

The bias unit 14 shown in FIG. 6 is one example of the constant voltage circuit, and the bias voltage Vb may be generated using another constant voltage circuit or a regulator. Furthermore, the setting of the bias voltage Vb may be performed in a state in which the control voltage Vcnt has a low level VL, by having a laser incident on the resonator 16, and adjusting the variable resistor 45, while monitoring the intensity of the reflected light. At this time, the variable resistor 45 is adjusted so that the intensity of the reflected light has a minimum value. In this case, it is possible to perform a correction of the resonance wavelength $\lambda_m$ with high accuracy.

As described above, when the voltage is applied to the resonator 16, the resonance wavelength $\lambda_m$ of the resonator 16 shifts to become larger. Furthermore, with regard to the Fabry-Perot type resonator, since the resonance wavelength $\lambda_m$ is given by Equation 1, when the film thickness t is thick, the resonance wavelength $\lambda_m$ is large, and when the film thickness t is thin, the resonance wavelength $\lambda_m$ is small. Accordingly, in the light modulation device 10 related to the present embodiment, in order to adjust the resonance wavelength $\lambda_m$, it is preferable to carry out planarization so that the film is thinner than the film thickness t at which the target resonance wavelength $\lambda_m$ occurs.

The bias voltage Vb may be set by automatic control. Even in cases in which automatic control of the bias voltage Vb is carried out, in cases in which a property of the light modulating film 34 changes with time, and in cases in which the wavelength of the incident laser changes, it is possible to perform control so as to have a preferable resonance wavelength $\lambda_m$. For example, a ferroelectric substance such as PLZT or the like is known to have an imprint phenomenon in which, by continuously applying a voltage in the same direction, a polarization amount generated in the ferroelectric substance is put in memory.

Figure 7:
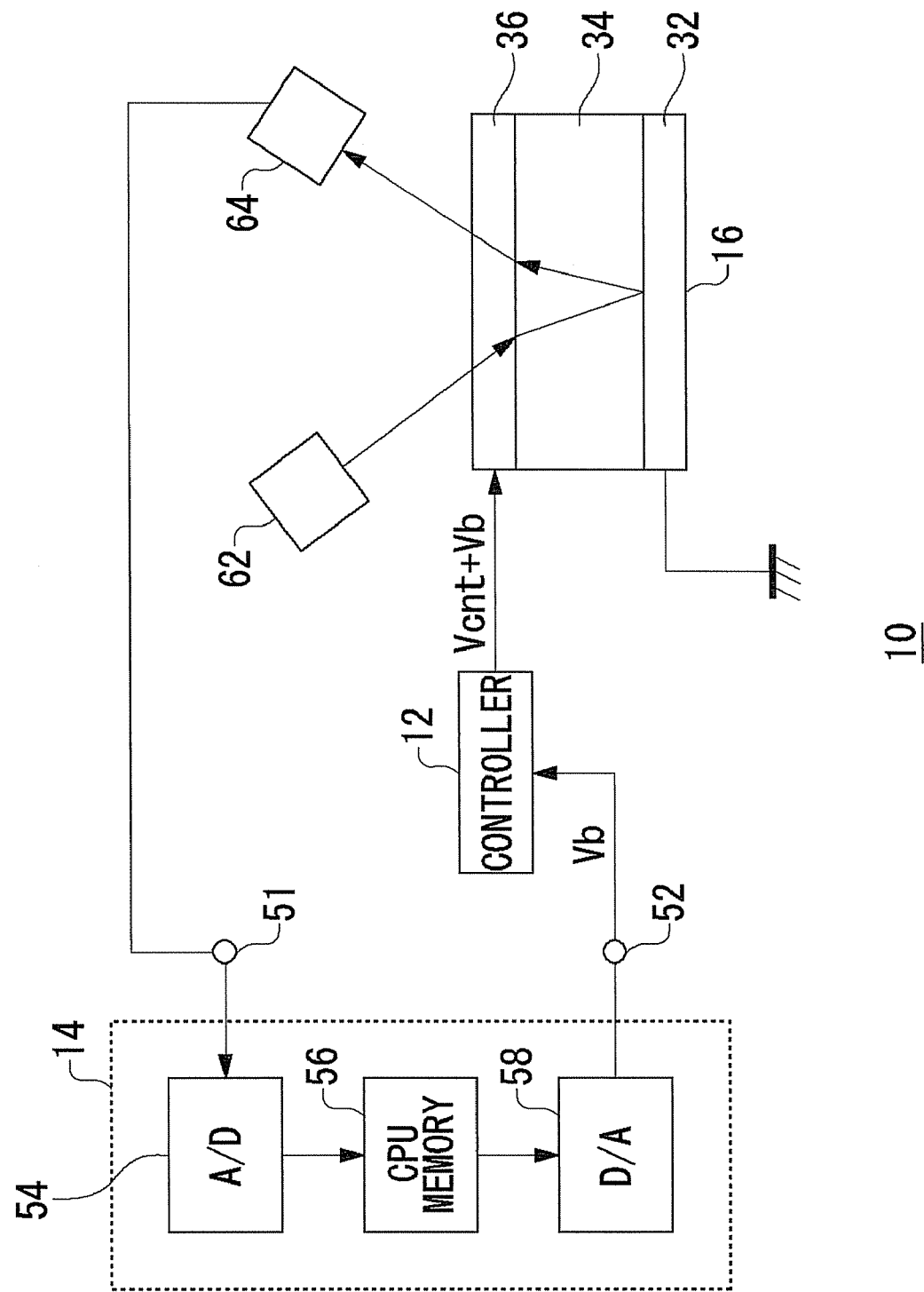
FIG. 7 is a view showing a configuration of the light modulation device in which a bias voltage Vb is set by automatic control.

FIG. 7 is a view showing a configuration of the light modulation device 10 in which the bias voltage Vb is set by automatic control. The bias unit 14 shown in FIG. 7 is provided with an A/D converter 54, a CPU memory 56, and a D/A converter 58.

An explanation is now given concerning operation of the light modulation device 10 shown in FIG. 7. The light modulation device 10 of FIG. 7 monitors the intensity of the light reflected from the resonator 16, and adjusts the bias voltage Vb by performing feedback control.

Light from a laser source 62, which is radiated on the resonator 16 and reflected, is converted to an electrical signal by a light detection element 64 such as a hot diode, a CCD, or the like. The light detecting element 64 is arranged at a position at which detection of the laser reflected from the resonator 16 is possible. For example, the reflected light may be bifurcated by a beam splitter, not shown in the figure, and made incident on the light detecting element 64.

An electrical signal generated by the light detection element 64 is inputted from an input terminal 51 to the bias unit 14. The electrical signal is converted into a digital value by the A/D converter 54, and is taken in by the CPU memory 56. The CPU memory 56 controls the bias voltage Vb so that the intensity of the light detected by the light detecting element 64 is minimal. A signal outputted from the CPU memory 56 is converted into an analog value by the D/A converter 58, and the bias voltage Vb is outputted at the output terminal 52.

By performing automatic control of the bias voltage Vb, it is possible to control the resonance wavelength $\lambda_m$ of the resonator 16 to always have a value the same as the wavelength of the laser source 62.

The bias unit 14 shown in FIG. 7 may be integrated on the substrate 30 shown in FIG. 1. In the light modulation device 10 related to the present embodiment, opaque material can be used in the substrate 30, in order to compose a reflective type of modulator. For example, if silicon is used for the substrate 30, the controller 12 and the bias unit 14 are formed on the substrate 30, and the light modulation device 10 can be formed on one chip, as a semiconductor integrated circuit device.

The light modulation device related to the present embodiment may be provided with plural groups of resonators and controllers. For example, by disposing the light modulation device 10 shown in FIG. 1 in a matrix form, the spatial light modulation device can be composed.

Figure 8A:
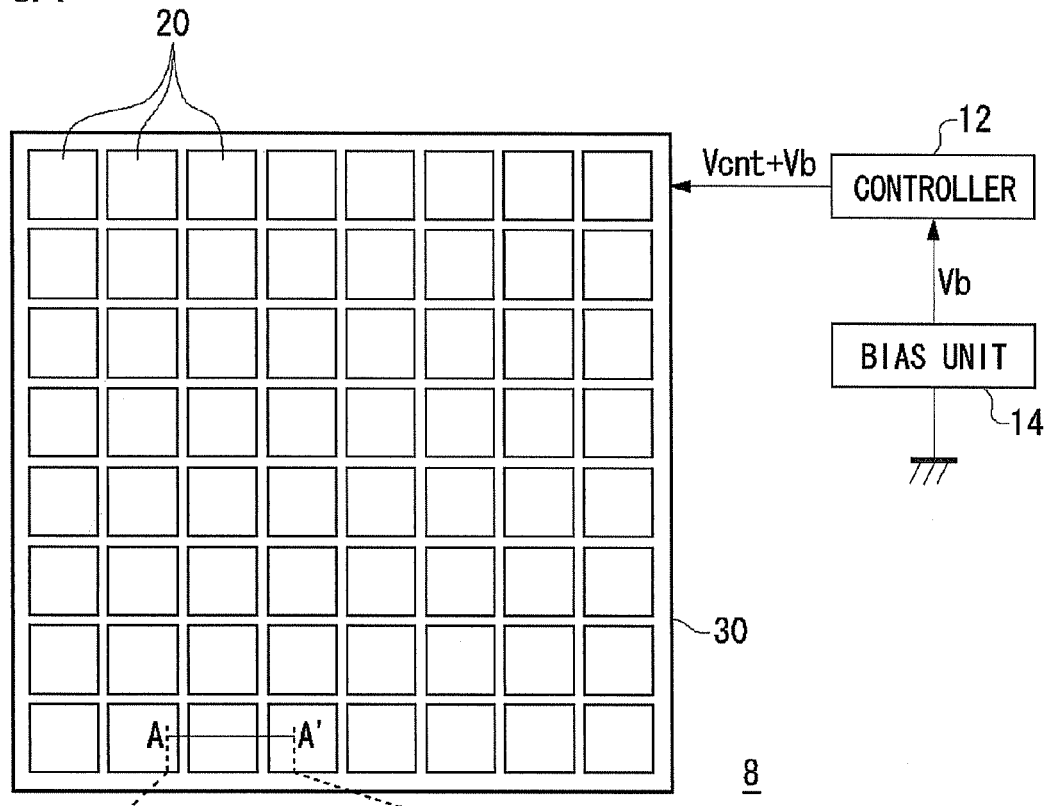
FIG. 8A is a view showing a spatial light modulation device in which the light modulation device is disposed in a matrix form.

FIG. 8A is a view showing the spatial light modulation device 8 in which the light modulation device is disposed in a matrix form. The spatial light modulation device 8 is provided with a plurality of pixels 20 disposed in a two dimensional form of 8 rows and 8 columns on the substrate 30. The pixels 20 are composed with a size of approximately 20 μm×20 μm.

Figure 8B:
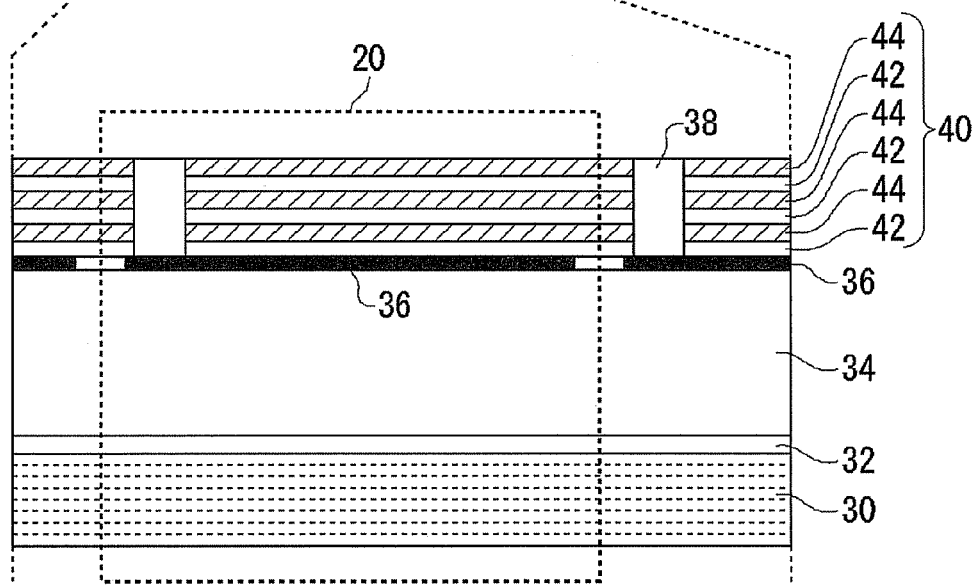
FIG. 8B is a sectional view along a line A-A' of the spatial light modulation device shown in FIG. 8A.

FIG. 8B is a sectional view along a line A-A' of the spatial light modulation device shown in FIG. 8A. Component elements, such as the light modulating film 34 and the like, are the same as in the resonator 16 shown in FIG. 1.

As shown in FIG. 8B, the transparent electrode 36 is drawn to the outside by a via and a wire 38. Al or the like may preferably be used as material for the wire 38. A protective film may additionally be formed on the upper surface of the wire 38.

In the spatial light modulation device 8, the control voltage Vcnt is given by the controller 12 for each of the pixels 20, and the reflectance can be controlled for each pixel 20.

The spatial light modulation device 8 may be provided with a bias unit 14. The configuration of the bias unit 14 and setting method of the bias voltage Vb are the same as the configuration and method explained using FIG. 6 and FIG. 7. When variations in film thickness are small between each of the pixels 20 in the spatial light modulation device 8, since a common bias voltage Vb may be superimposed on each pixel 20, at least one bias unit may be provided for one spatial light modulation device 8.

The bias unit may be provided for each pixel 20. In such cases, it is possible to perform correction of the resonance wavelength $\lambda_m$ with higher accuracy.

In the spatial light modulation device 8, when planarization of the upper surface of the light modulating film 34 is performed, effects of light scattered from neighboring pixels 20 can be reduced.

Figure 9:
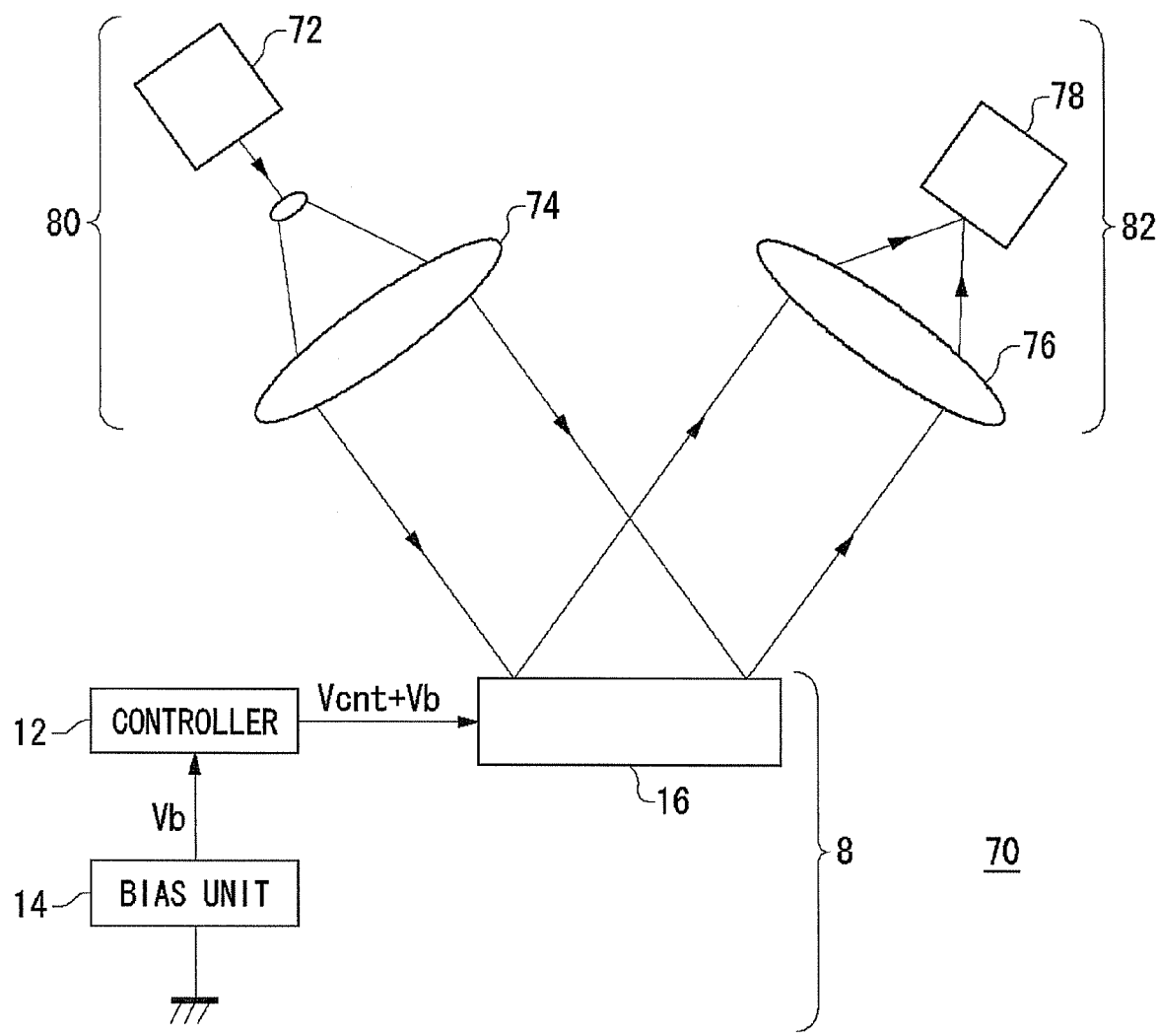
FIG. 9 is a view showing a hologram recording device using the spatial light modulation device.

It is possible to compose various light modulation systems using the spatial light modulation device 8. FIG. 9 is a view showing a hologram recording device 70 using the spatial light modulation device 8. The hologram recording device 70 is provided with a light emitter 80, a light receptor 82, and the spatial light modulation device 8. The light emitter 80 is provided with a laser source 72 and a beam expander 74. The light receptor 82 is provided with a Fourier transform lens 76, and a recording medium 78.

In the hologram recording device 70, the laser emitted from the laser source 72 is split into two beams by a beam splitter, not shown in the figure. Among these, one of the beams is used as a reference beam, and is guided into the recording medium 78. The other of the beams has its beam diameter enlarged by the beam expander 74, and is radiated to the spatial light modulation device 8 as a parallel beam.

The beam radiated on the spatial light modulation device 8 is reflected from the spatial light modulation device 8 as a signal beam having a different intensity for each pixel. This signal beam passes through the Fourier transform lens 76, undergoes a Fourier transformation, and is condensed inside the recording medium 78. Inside the recording medium 78, light paths of the reference beam and the signal beam, including a hologram pattern, intersect and form an optical interference pattern. The overall optical interference pattern is recorded in the recording medium 78 as a change in refractive index (refractive index grating).

An explanation has been given above concerning cases in which the spatial light modulation device 8 is used as the hologram recording device 70; however, there is no limitation thereto, and a display device, an optical communication switch, an optical communication modulator, an optical computation device, an encryption circuit, and the like, can also be used.

While the preferred embodiments of the present invention have been described using specific terms, such description is for illustrative purposes only, and it is to be understood that changes and variations may be made without departing from the spirit or scope of the appended claims.

What is claimed is:

1. A light modulation device provided with a Fabry-Perot type of resonator in which a light modulating film, whose refractive index changes in accordance with an applied electrical field, is arranged between two reflective layers, wherein the resonator comprises:
   a substrate;
   a first reflective layer arranged on the substrate;
   the light modulating film arranged on the first reflective layer;
   a transparent electrode arranged on the light modulating film; and
   a second reflective layer arranged on the transparent electrode;
   wherein the first reflective layer is structured to serve as an electrode;
   the first reflective layer and the transparent electrode are structured to apply the electrical field to the light modulating film; and
   at least one dimension of irregularities on an upper surface of the light modulating film are less than or equal to 1/100 of the wavelength of light incident on the light modulation device.

2. A light modulation device according to claim 1, wherein the light modulating film is formed of an electro-optic material in which refractive index changes in proportion to the applied electric field to the power of 2.

3. A light modulation device according to claim 2, wherein the electro-optic material is lead zirconate titanate or lead lanthanum zirconate titanate.

4. A light modulation device according to claim 1, further comprising:
   a controller for modulating and outputting light incident on the resonator, by applying a control voltage to the resonator.

5. A light modulation device according to claim 4, further comprising:
   a bias unit for applying, to the resonator, a bias voltage for adjusting resonance wavelength of the resonator.

6. A light modulation device according to claim 4, wherein the light modulation device is formed on one chip as a semiconductor integrated circuit device.

7. A light modulation device according to claim 5, wherein the light modulation device is formed on one chip as a semiconductor integrated circuit device.

8. A light modulating system comprising:
   a light modulation device according to claim 1;
   a light emitter for radiating light on the light modulation device; and
   a light receptor for receiving light outputted from the light modulation device.

* * * * *